Nov. 25, 1941.   J. C. WATTLEWORTH   2,263,686
DRILLING ATTACHMENT FOR SCREW MACHINES
Filed March 4, 1940    2 Sheets-Sheet 1

INVENTOR.
JOHN C. WATTLEWORTH
BY
ATTORNEYS.

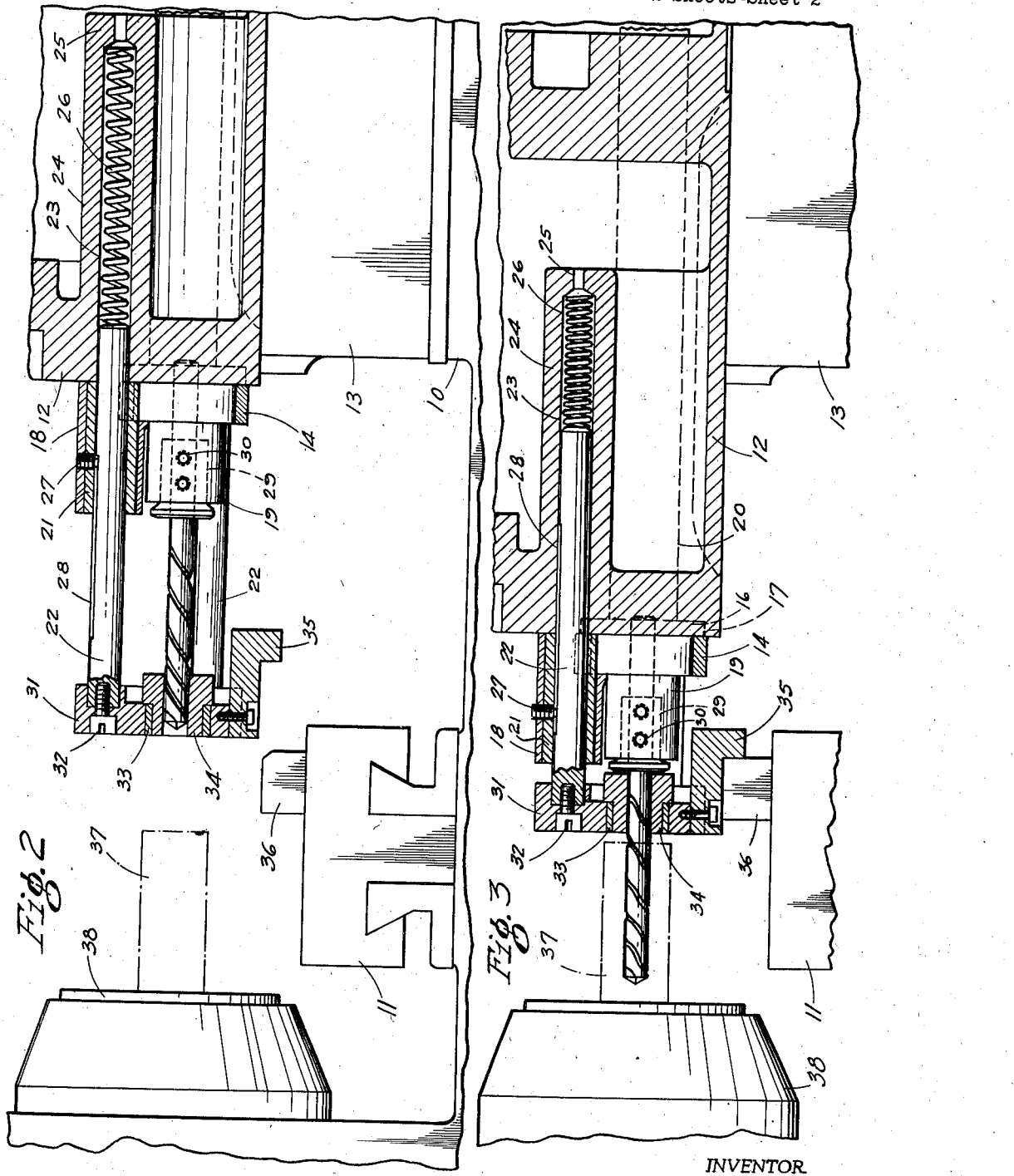

Patented Nov. 25, 1941

2,263,686

UNITED STATES PATENT OFFICE 2,263,686

DRILLING ATTACHMENT FOR SCREW MACHINES

John C. Wattleworth, Cleveland, Ohio, assignor to The Cleveland Automatic Machine Company, Cleveland, Ohio, a corporation of Ohio Application March 4, 1940, Serial No. 322,191

2 Claims. (Cl. 29—57)

This invention relates broadly to automatic screw machines and more specifically to a mechanism for supporting drills and similar tools in the tool slide or turret embodied in such machines.

It is customary in automatic screw machine practice to center drill the work as a preliminary step to a drilling operation which entails the use of tools too long or slender to initiate the cut without running out of center. Thus in the past the tool set for such types of work has included a center drill which necessarily occupied one of the stations in the tool turret. There are, however, certain types of work which tax the capacity of the turret to such extent as to require elimination of some of the end working tools.

To this end the present invention contemplates a drill guide mechanism adapted to support the end portion of a relatively long drill during the period in which it is started into the work and thus free the station in the turret formerly required for the support of the center drill.

In addition to the foregoing object the invention further contemplates a drill holder which is adapted for ready installation upon various types of turret heads, constructed to facilitate the interchangeability of drills of various size and a holder which will support the tool in accurate aligned relation with the axis of the work throughout the drilling operation.

Other objects and advantages more or less ancillary to the foregoing and the manner in which all the various objects are realized will appear in the following description, which considered in connection with the accompanying drawings, sets forth the preferred embodiment of the invention.

Referring to the drawings,

Fig. 2 is a fragmentary view partially in section of the tool turret shown in Fig. 1, including the drill guide embodying the present invention and the work holding spindle of the screw machine; and Fig. 3 is a view similar to that shown in Fig. 2 but with the turret advanced to the position where the drill has completed the depth of its cut.

Figure 1:
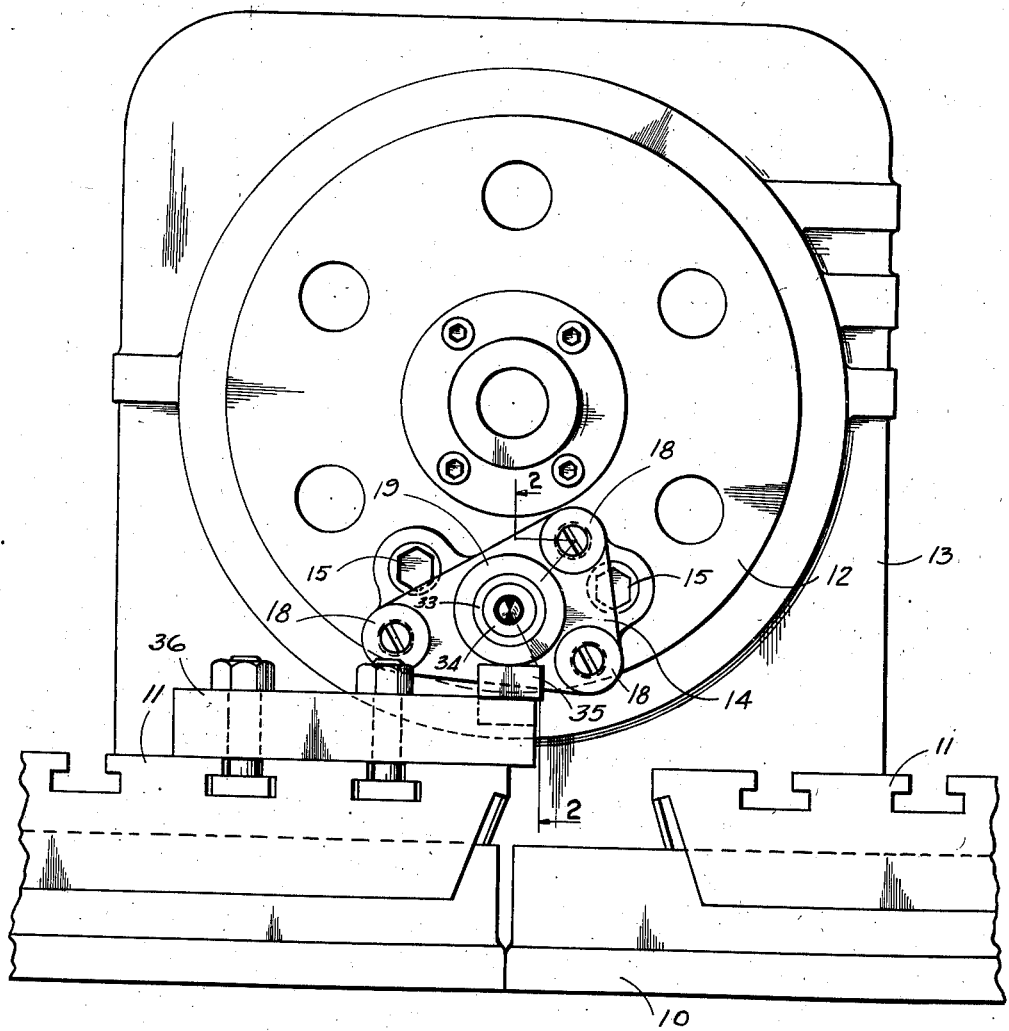
Fig. 1 is a fragmentary elevational view of a portion of a single spindle automatic screw machine illustrating the face of a tool turret having the improved drill supporting attachment mounted thereon.

Referring first to Fig. 1, the bed of the machine 10 is provided with cross slides 11 of the conventional form which, as shown, are disposed slightly below the lower station in a tool turret 12.

The tool turret chosen herein for purpose of illustration is of the type which is constructed for reciprocative movement within the turret head 13 though obviously the invention is susceptible for use upon turrets or tool slides of other form. The tool guide comprises a base plate 14 secured upon the face of the turret by cap screws 15, the base plate being centrally located in relation to the tool opening in the turret by a pilot 16 seated in a counter bore 17 in the face of the turret. The base plate 14 is formed with bosses 18, circumambient the spindle or tool holder 19 which is mounted in a bore 20 in the turret and guided within the base plate 14. The tool holder or spindle may be rotatively driven within the turret by gearing (not shown) or may be nonrotatively supported therein. The bosses 18 are bored for the reception of bushings 21 which are machined to receive guide rods 22 extending therethrough and protruding into openings 23 drilled in bosses 24 formed in the inner walls of the tool turret 12. Intermediate the ends of the guide rods 22 and the walls 25 defining the inner ends of the openings 23 there are compression springs 26 which urge the guide rods outwardly to the extended position, as shown in Fig. 2, where further movement thereof is restrained by the engagement of screws 27 with the shouldered end of the key ways 28 formed in the guide rods 22.

The spindle or tool holder 19 is bored for the reception of bushings 29 which are split throughout their length to compressively engage and clamp the shank of the drill mounted therein when the set screws 30 in the sleeve 19 are tightened against the periphery of the bushing. The bushings 29 are bored respectively for each size of drill within the range contemplated by the design of the fixture though the overall dimensions of the bushing are of uniform size in order to accommodate the assembly of the bushings within the bore or opening in the end of the spindle.

Upon the ends of the guide rods 22 there is a tie bar 31 formed with bosses in the rearward face thereof, which are machined for telescopic engagement with the ends of the rods and drilled for the reception of cap screws 32 to effect the securement of the tie bar upon the guide rods. The central portion of the tie bar 31 is bored to receive a liner bushing 33 adapted to support the guide bushings 34. Upon the lower face of the tie bar 31 there is a pad 35 formed with a depending lug in the end portion thereof and arranged for abutting engagement with a stop block 36 mounted upon one of the cross slides 11 in position to maintain the tie bar 31 in spaced relation with the end of the work piece 37.

In operation, as the turret is advanced toward the work holding spindle 38 the supporting structure for the drill will remain in the extended position illustrated in Fig. 2 until the movement of the tie bar 31 is arrested by engagement of the pad 35 with the stop block 36. As will be seen in Fig. 3, the tie bar 31 when so restrained is held in close proximity with the end of the work so that upon continued movement of the turret the end portion of the drill will be supported by the bushing 34 when the point of the drill is brought into engagement with the work piece 37.

Operation of the drill is effected by the rotation of the drill and/or work holding spindle, the depth of cut being determined by the extended position of the drill relative to the translation of the turret.

It will be recognized from the foregoing that the retractable mounting of the tie bar 31 as afforded through the guide rods 22 and springs 26 will accommodate the support of the end of a drill as it enters the work irrespective the length or size thereof, moreover, that the stop block 36 will elevate the drill guide and maintain the bushing 34 in coaxial alignment with the work in the event the structure sags below the axis of the work and will restrain the assembly from undue vibration during the use thereof.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. In a screw machine embodying a work holding spindle, a tool holding spindle, a tool cross slide and a longitudinal tool slide, a drilling apparatus therefor comprising a base plate affixed to the face of the turret, guide rods extended therethrough and mounted in the longitudinal tool slide, springs mounted in the longitudinal tool slide engaged with said rods, a tie bar secured to the outer ends of said rods, a bushing therein, a drill in said tool spindle extending through said bushing, a pad on the lower face of said tie bar, a lug depending therefrom, a block mounted on said cross slide engageable with said pad, said pad being arranged to effect the aligned relation of said drill with the work holding spindle and said lug being disposed to support said tie bar in spaced relation with the end of the work in the work holding spindle.

2. In a screw machine embodying a work holding spindle, a tool cross slide, a longitudinal tool slide having guide rod holes therein and a tool holder in the longitudinal slide, a drilling apparatus therefor comprising a plate piloted in the longitudinal tool slide, said plate having an opening therein constituting a supporting bearing for the tool holder, guide rods slidably mounted in said plate and supported in the longitudinal tool slide bearing holes, springs in said bearing holes engaged with said rods, a tie bar uniting the ends of said rods, a bushing in said tie bar, a drill in said tool holder supported in said bushing, a block on said cross slide and a lug on said tie bar engageable with said block for holding said tie bar and guide rod assembly clear of the work piece in the work holding spindle.

JOHN C. WATTLEWORTH.